United States Patent
Liu et al.

(10) Patent No.: US 7,937,188 B2
(45) Date of Patent: May 3, 2011

(54) CHIP OVERHEATING PROTECTION

(75) Inventors: Michael Yu Liu, Costa Mesa, CA (US); Bradley Eugene Roach, Costa Mesa, CA (US); Vuong Cao Nguyen, Costa Mesa, CA (US); Peter Mark Fiacco, Costa Mesa, CA (US); Shak Loong Kwok, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 252 days.

(21) Appl. No.: 11/805,581

(22) Filed: May 23, 2007

(65) Prior Publication Data

US 2008/0294296 A1 Nov. 27, 2008

(51) Int. Cl.
G06F 15/00 (2006.01)
(52) U.S. Cl. .......... 700/299; 710/10; 702/132; 713/300; 709/221
(58) Field of Classification Search .......... 700/299, 700/300; 709/221; 710/8, 10; 713/300; 340/606, 635; 361/695, 704; 702/130, 132; 360/78.07
See application file for complete search history.

(56) References Cited

U.S. PATENT DOCUMENTS

| | | | | |
|---|---|---|---|---|
| 6,337,630 | B1 * | 1/2002 | Hass et al. | 340/606 |
| 6,557,049 | B1 * | 4/2003 | Maloy et al. | 710/8 |
| 6,995,946 | B2 * | 2/2006 | Ding et al. | 360/78.07 |
| 6,996,441 | B1 * | 2/2006 | Tobias | 700/44 |
| 7,400,945 | B2 * | 7/2008 | Radhakrishnan et al. | 700/299 |
| 2004/0264036 | A1 * | 12/2004 | Ding et al. | 360/78.08 |
| 2006/0161375 | A1 * | 7/2006 | Duberstein et al. | 702/132 |
| 2007/0250219 | A1 * | 10/2007 | Gaskins et al. | 700/299 |

* cited by examiner

*Primary Examiner* — Ramesh B Patel
*Assistant Examiner* — Douglas S Lee
(74) *Attorney, Agent, or Firm* — Morrison & Foerster LLP

(57) ABSTRACT

Embodiments of the present invention are directed to systems and methods for controlling the temperature of an internal device while reducing or minimizing the involvement of the host. Thus, some of the heat monitoring and remediation work may be offloaded to the actual device itself. The device may monitor its own temperature and, in the event of high temperature, perform device specific heat reduction actions without involving the host. Furthermore, the device may, upon detecting temperature within a predefined range, alert the host of a high temperature condition in order to allow the host to perform temperature reduction measures. Also, the device may, upon detecting temperature within a predefined range, alert the host of an impending device shutdown and shut the device down. In addition, the device may periodically save its temperature into non-volatile memory in order to create a temperature log.

41 Claims, 5 Drawing Sheets

CHIP OVERHEATING PROTECTION

FIELD OF THE INVENTION

This invention relates to protecting electronic devices from overheating, and more particularly to protecting a chip which is part of a general purpose host computer or server from over heating.

BACKGROUND OF THE INVENTION

Computers have various devices attached to them. These may include network cards, video cards, sounds cards, etc. These devices are considered part of a computer but many include some autonomous computational functionality as well. Thus, many of these devices include integrated circuits.

Modern manufacturing technologies allow integrated circuits or chips to be manufactured with smaller and smaller feature sizes. For example, current technology may allow the manufacturing of chips with a 90 nm feature size. This allows more features to be placed on a chip of a given size, thus allowing an increase in functionality of a chip without increasing its size. However, placing more and more features in a small area increases the heat generated by the chip per given area, because the power consumed by transistors usually does not decrease at the same rate as their size. This problem is worsened by the fact that decreasing the feature size often comes with a tradeoff of increased leakage current which also produces heat.

Furthermore, many types of modern computers, especially network servers and the like, are often designed to be smaller as well. Decreasing the size of a computer, or increasing the density of computing devices (e.g., blade servers) often reduces and/or removes various air channels and vents from it, thus decreasing its ability to remove heat from its internal components. The above issues cause some concern for temperature management of the various devices within a computer. There are several solutions for controlling the temperature of a chip of a device. For example, a heat sink may be placed over or in proximity to the chip. In addition, a fan may be used to draw hot air away from the chip and create and air current that cools the chip down. While using a fan is beneficial for most devices it may cause problems for devices that need to be on at all times, such as devices that are a part of networked storage servers, web servers, etc. Keeping a fan on at all times will severely shorten the life of the fan, and thus of the device. Therefore, a scheme of selectively turning the fan on and off is needed.

Existing systems usually rely on a host to monitor the temperature condition of devices connected to the host. Thus, a computer's main CPU (usually executing OS procedures) may monitor the temperatures of the devices of the computer (such as, e.g. network cards, HBAs, video cards, etc.) and take action if any of these temperatures are too high. For example, the CPU may turn on a fan, speed up an already running fan, stop sending commands to the device that is overheating, etc.

However these prior art system require constant periodic interruptions of the computer's main CPU for the purpose of monitoring the temperatures of connected devices. These interruptions may significantly affect the computer's overall performance.

SUMMARY OF THE INVENTION

Embodiments of the present invention are directed to systems and methods for controlling the temperature of an internal device while reducing or minimizing the involvement of the host. Accordingly embodiments of the present invention provide for offloading some of the heat monitoring and remediation work to the actual device itself, thus minimizing the required involvement of the host. Some embodiments provide for the device to monitor its own temperature and, in the event of high temperature, perform device specific heat reduction actions without involving the host.

Furthermore, according to some embodiments, the device may, upon detecting temperature within a predefined range, alert the host of a high temperature condition in order to allow the host to perform temperature reduction measures. Also, the device may, upon detecting temperature within a predefined range, alert the host of an impending device shutdown and shut the device down. In addition, the device may periodically save its temperature into non-volatile memory in order to create a temperature log that may be accessed in the event of device failure.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in terms of host bus adapters (HBAs), it should be understood that the present invention is not limited to host bus adapters, but is generally applicable to any internal devices that are part of a host computer.

Embodiments of the present invention are directed to systems and methods for controlling the temperature of an internal device while reducing or minimizing the involvement of the host.

In particular, embodiments of the present invention provide for offloading as much of the heat monitoring and remediation work as practicable to the actual device itself, thus minimizing the required involvement of the host. As noted above, the embodiments discussed herein refer to an HBA, but the teachings of the invention are applicable to other types of devices.

Figure 1B:
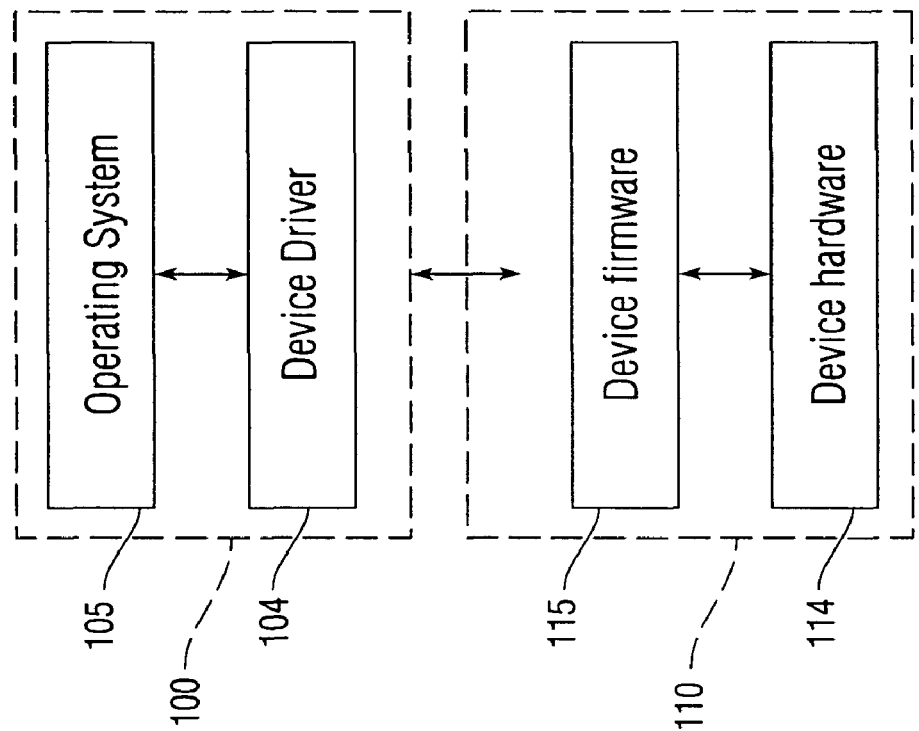
FIG. 1B is an illustration of various software and hardware entities that may be involved with embodiments of the present invention.
Figure 1A:
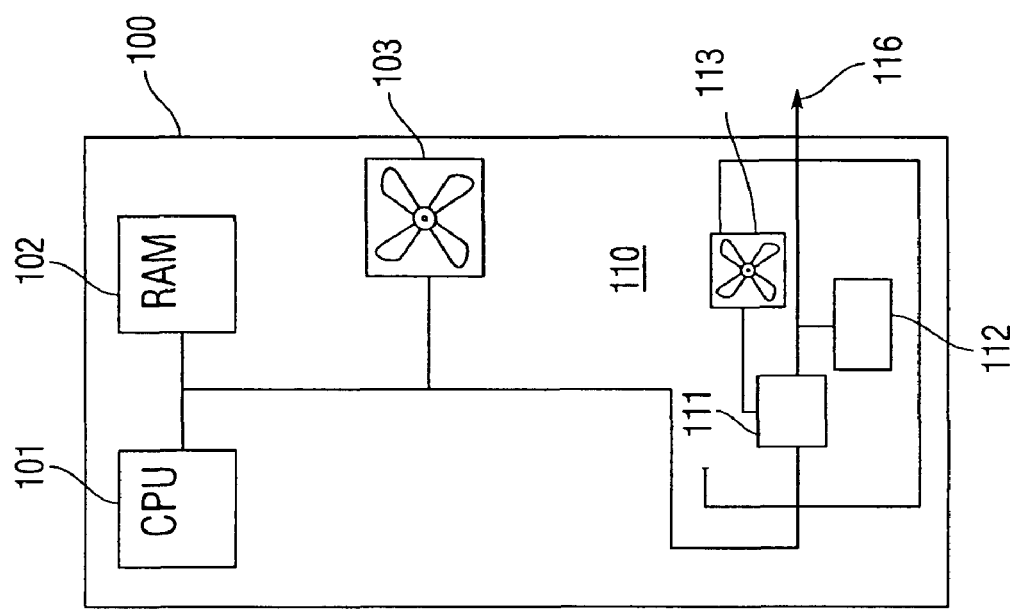
FIG. 1A is an illustration of an exemplary computer according to embodiments of the present invention.

FIG. 1A is a diagram of a host computer according to embodiments of the present invention. The host computer includes a CPU 101 and a memory 102. The memory may include various software such as an Operating System (OS) and various drivers. The host computer may include a host fan 103. Many host computers include multiple fans (not shown).

The fan may be controlled by the CPU by way of software executing at the CPU. The host computer may also include a device 110. The device may be for example a host bus adapter. The device may include a processor 111 (such as, for example, an ARM processor) and a memory 112. The memory 112 may be, for example, Flash memory, ROM, EPROM, etc. The memory 112 may include firmware for the device 110. The device may also include a local or device fan 113. If the device is an HBA, it may be connected to an external network through a network connection 116.

FIG. 1B is an illustration of various software and hardware entities that may perform functions associated with embodiments of the present invention. Device hardware 114 may be application specific hardware that performs certain functions of embodiments of the present invention, such as for example comparing temperature values, turning a device fan on and off, etc. The device firmware 115 is software executed at the device processor 111. The firmware 115 may be stored in memory 112. The firmware may communicate with the device hardware by setting various registers or providing control values for the hardware 114. The device hardware and device firmware are part of the device 110.

The device driver 104 and OS 105 are part of the host 100 and execute at the host processor 101. The software of the driver and the OS may be stored, for example, in RAM 102 and/or additional non-volatile storage. The device driver 104 and OS 105 may communicate with the firmware 115 to receive alerts of the temperature state of the firmware. If the device shuts down, the device driver and the operating system may communicate directly with the device hardware 114 to determine the temperature of the device and/or restart the device.

Various methods may be used to control the temperature of the device 110. For example, power island technology may be utilized. Power island is an advanced technology used to control the amount of power a chip draws (which is directly related to the heat that chip generates). The power islands method provides for separating a chip into various areas (islands) and selectively powering these areas up or down to control the power a chip consumes. It should be noted that the power islands technologies provides for fully powering some islands down by turning off all electrical power going into these regions, instead of merely idling the islands by turning of their inputs or clocks.

Figure 2:
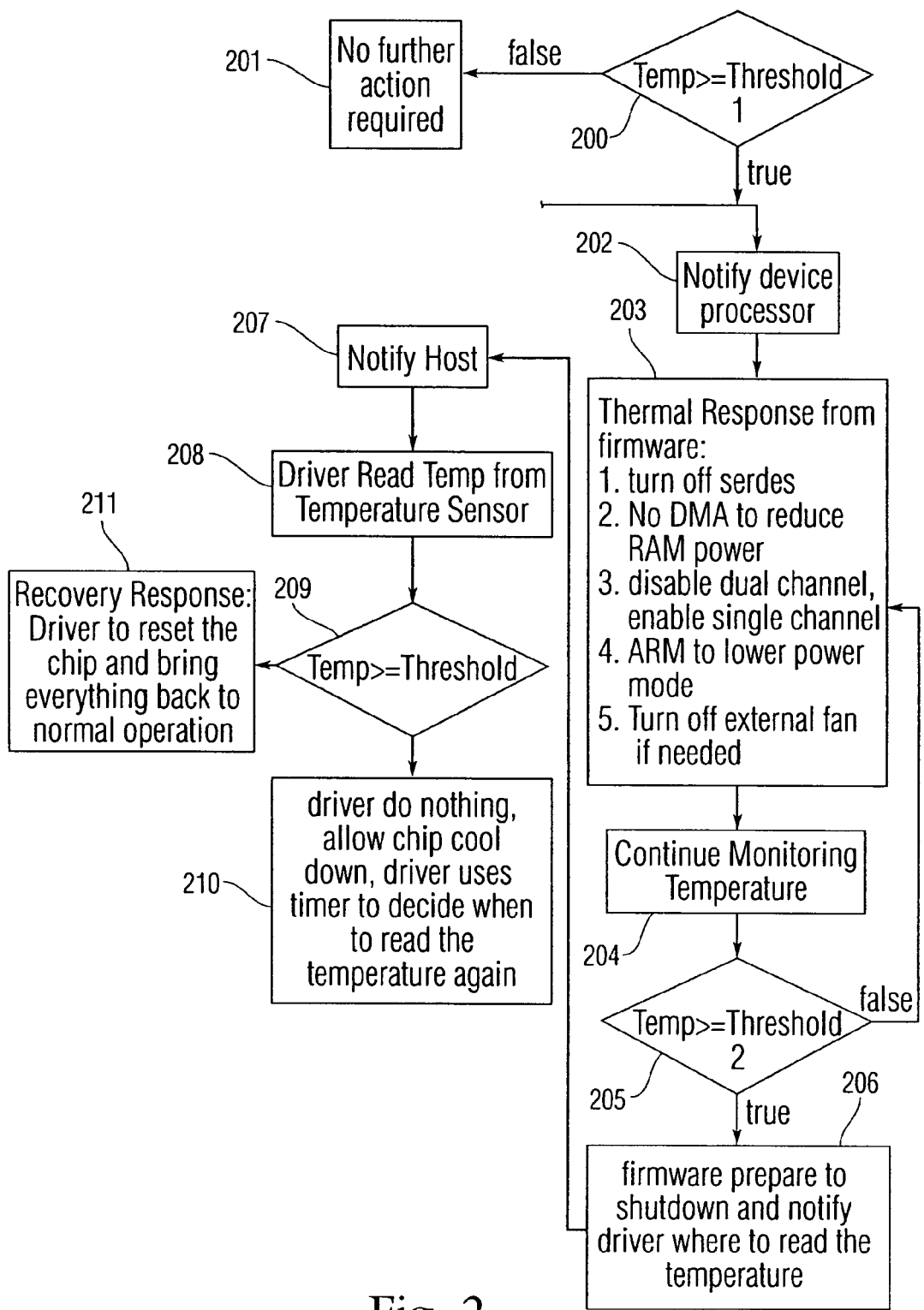
FIG. 2 is a flowchart showing the operation of certain embodiments of the present invention.

FIG. 2 is a flowchart showing the operation of some embodiments of the present invention. At step 200, it is determined whether the temperature is over a predefined threshold. Step 200 may be performed by a hardware comparator at the device hardware. If the temperature does not exceed the threshold, no further action is required (step 201). If, however, the temperature does exceed the threshold, the device processor (usually an ARM processor) is notified (step 202). Notifying the processor usually means notifying device firmware 115 which is running at the device processor.

Once the firmware is notified, the firmware may perform various actions local to the device in order to reduce the temperature. These actions may include, for example, turning off the serializer/deserializer (serdes). Serdes may be turned off by turning off its inputs and/or its clock signal. Alternatively, it may be entirely shutdown by utilizing the power island technology discussed above. In addition, if the power island technology is being utilized, other power islands may also be turned off.

Also, direct memory access (DMA) from the device to the host's memory 102 may be disabled in order to reduce power. In addition the device may switch from dual channel to single channel mode. Many HBAs feature two channels for processing of network communications in order to improve the speed of processing (see discussion of FIG. 3 below for details). Disabling one of the channels may reduce power and thus reduce the heat produced by the device, at the cost of decreasing the device's rate of processing network communications.

Another option is to set the device processor to a lower power mode. Yet another option is to turn on the device's fan 113. A combination of any number of these remedial measures may be utilized by the device firmware in order to control the device temperature without involving the host. A person of skill in the art would recognize that other local measures may be possible as well.

At step 204, the firmware continues monitoring the temperature of the device. At step 205 the temperature is compared to the threshold. If the temperature is not higher than the threshold, then monitoring is continued.

If the temperature is still higher than the threshold, then the actions of step 203 have failed to control the temperature of the device. At this point the firmware prepares to shut down and notifies the device driver 104 running at the host processor 101 how to read the device temperature (step 206). The notification is necessary, because the device cannot read its own temperature after it shuts down. However, even after shut down some rudimentary circuits allowing the host to read the temperature from the device may remain powered up.

At step 207, the device notifies the host that it is shutting down. At step 208, the driver, having received the notification, waits for the shutdown device to cool off and then checks the temperature of the device according to the instructions of step 206. At step 209, the driver again compares the temperature to the threshold. If the temperature is still higher the driver waits again for the temperature of the shut down device to cool off (step 210). The driver may use a timer to determine when to check the device's temperature again. If the temperature is lower than the threshold, then the driver restarts the device and brings it back to normal operation.

According to some embodiments of the invention the device may store a log of periodic measurements of its temperature into non-volatile memory, such as flash memory. Thus, if the device fails and must be replaced, the log may be subsequently read. This may help various interested parties determine what exactly caused the device's failure. This may in turn assist manufacturers in discovering design defects, warranty and insurance providers in determining exact causes of failure, etc.

According to another embodiment of the invention, the temperature condition of a device may be divided into four different states. A normal state refers to a normal temperature condition in which no remedial actions need to be taken. A high temperature condition signifies a temperature that is higher than desired. In this case, the HBA turns on a the HBA's fan. The HBA's fan is a local fan positioned at the HBA and should be distinguished from any fans that are associated with the host computer.

The HBA may subsequently turn the fan off if its temperature decreases. However, if the temperature keeps rising, even with the fan on, the heat control process enters a third state—the warning state. The warning level is associated with heat which is too high to be reasonably addressed by the HBA itself. At this point the HBA sends a message to driver software associated with the HBA. The driver software is not running at the HBA but at the host computer. Therefore, the warning state is considered serious enough as to necessitate the involvement of the host.

The driver software and other software running on the host computer (such as, for example, the host's operating system), may address the heat condition in various ways. For example, they can power up or speed up a fan associated with the host computer, limit the amount of processing the HBA has to perform (e.g., by limiting the amount of data sent thereto), or alert a human operator, who may take other remedial actions.

If the temperature goes up from the warning state, a last error state is reached. The error state signifies that the temperature is at a critical level and there is a danger of actually damaging the device. The error state is intended to be reached very rarely in normal operation of the device.

In this case, a signal is sent to the driver notifying it that the HBA will be shut down, and the HBA is then shut down. The shutdown of the HBA is not total, but most heat data processing and heat generating modules can be turned off. For example, the HBA's processor and other data processing modules can be turned off.

The HBA's fan is kept on in order to continue cooling. Also kept on is the HBA's temperature sensor which is used to sense the HBA's temperature and various internal bus interfaces and memories which may allow the host to obtain information from the HBA (such as, for example, the HBA's temperature). When shutdown, the HBA is not able to perform its usual tasks (i.e., processing data for network communications). Also, the HBA is not able to run any software (or firmware) at its processor.

When a shutdown occurs, it is up to the host processor, running driver or OS software, to monitor the HBA's temperature and restart it if it is prudent to do so.

Quickly shutting down an HBA when a critical temperature is reached can be very beneficial in preventing damage to the HBA, partially because of a concept called "thermal runaway". Thermal runaway refers to a tendency of chips to increase their temperature at very high rates once certain temperature has been reached, because high temperatures actually change the operating characteristics of transistors on a chip. In fact, high temperatures often cause transistors to give off even more heat as they increase the leakage current. Therefore, a feedback effect occurs, which results in temperatures which rise at an ever-increasing rate.

Therefore, it is important that the HBA shutdown occurs quickly once dangerous temperatures have been detected. For that reason, the HBA shutdown is actually performed by the HBA itself and not by the host. The host is notified and involved, because once the HBA is shut down, it may no longer monitor or control itself. However, in some embodiments, a response from the host is not necessary to actually shut the HBA down.

The above scheme differs from most existing device temperature control schemes, as they usually provide that most temperature controls should be performed at the host's side.

Embodiments of the present invention also provide a flexible temperature control mechanism. Various parameters of the system, such as temperature levels for the various states, the frequency with which the HBA may poll its temperature in the various states, etc., may be specified by the host (e.g., by the driver) by writing various values in a flash memory located at the HBA. Thus, updates to the HBA's heat response scheme may be easily performed through the host.

In prior art devices the system (host) needs to monitor and "pull" the temperature. In embodiments of the present invention the host usually need not check the temperature of a device. Instead, the device usually sends, or "pushes" temperature notifications to the host when necessary (such as, for example, in the warning state or when shutting down). The host must monitor the HBA's temperature only on rare occasions, such as after shutdown in order to determine when and if the HBA should be turned back on. Furthermore, in embodiments of the present invention, even in the relatively rare cases when the host does need to monitor the device temperature, this task is made easier for the host, as the device may provide the host with a specific instructions as to how to check the hosts temperature before the device shuts down (e.g., by providing an address in device memory, which the host may access to check the temperature). In prior art systems the host may need to try different methods (e.g., different addresses) before it determines exactly how or where a particular device indicates its temperature.

Figure 3:
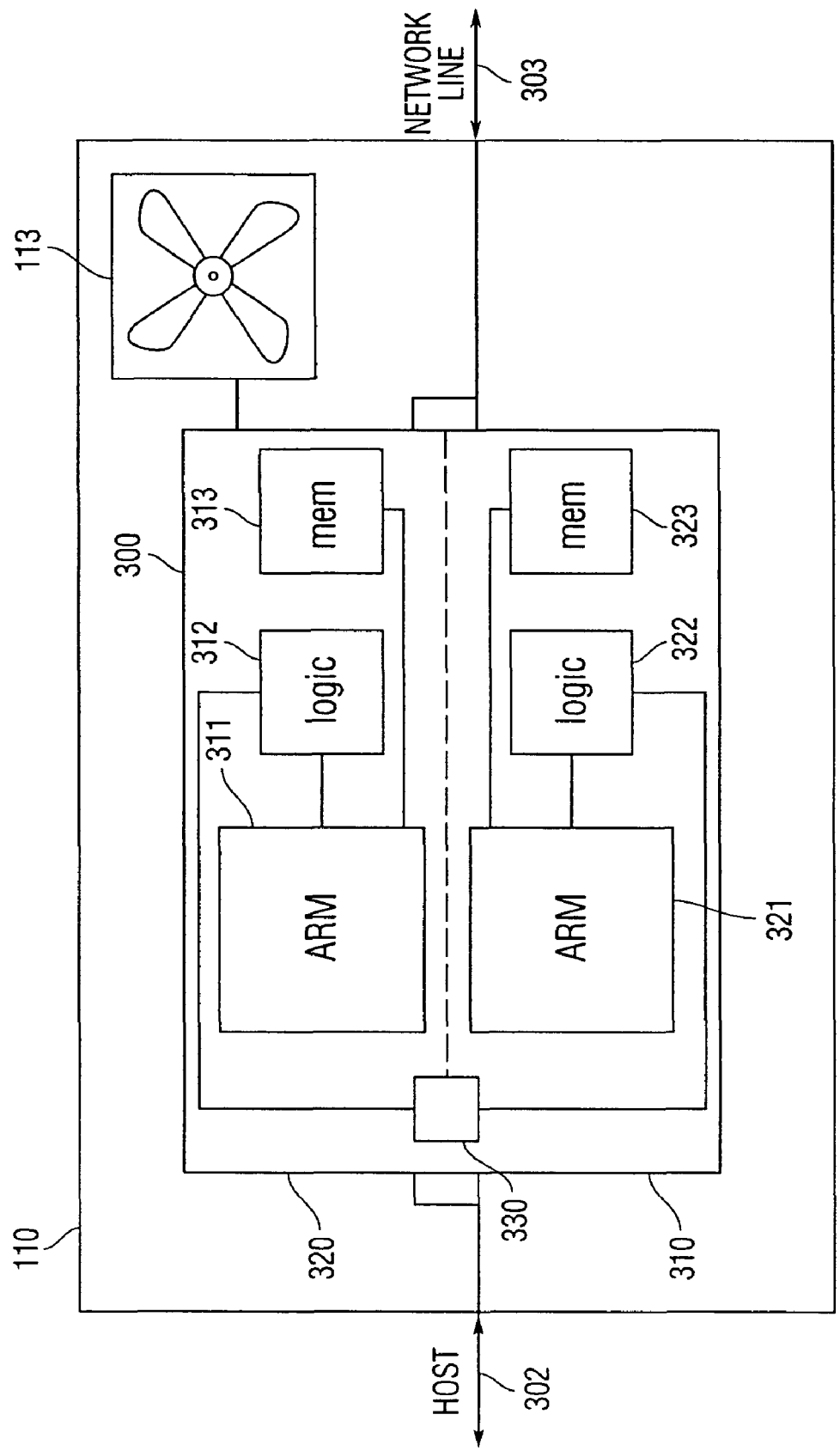
FIG. 3 is a diagram of a device according to embodiments of the present invention.

FIG. 3 shows an example chip 300 of an HBA device. The HBA device may be device 110. The chip is connected through the HBA device to the host through an internal bus 302. The chip is also connected to a network such as a Storage Area Network (SAN) through a link 303. The link may be, for example, a fiber optic link. The chip may have two channels (310 and 320) that are almost identical. The two channels may be used to process bidirectional communications in parallel.

Each channel includes an ARM processor (311 and 321, respectively), additional logic (312 and 322), and memory (313 and 323). The additional logic may be similar to device hardware 114 shown in FIG. 1B. A temperature sensor 330 is also placed on the chip. The temperature sensor is a single element that does not belong to a particular channel.

The temperature sensor outputs a value (e.g., a 10 bit binary value) which represents the current temperature of the chip. This value may later be converted into a degrees Celsius value by software running on one or both ARM processors. An example of a temperature sensor that may be used with embodiments of the present invention is the G90™ HM14TEMPSENS01 Temperature Sensor available at LSI-LOGIC®. The temperature sensor is connected to the two logic blocks 312 and 322.

Figure 4:
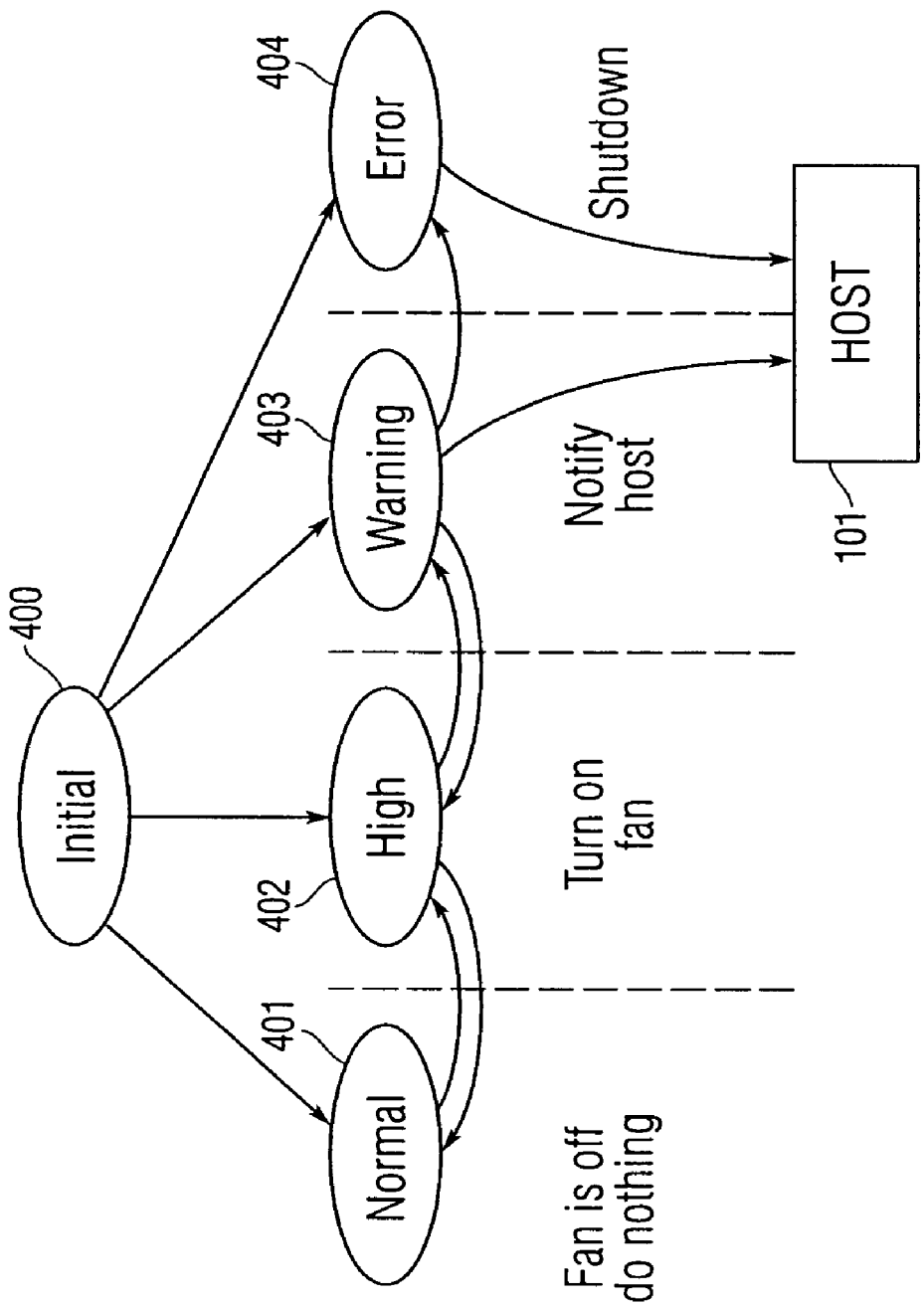
FIG. 4 is a state diagram of embodiments of the present invention.

FIG. 4 shows a state diagram of the firmware of the present invention. State 400 is an initial state. The initial state is reached on power-up or after reset of the device. At the initial state, the firmware checks the temperature at the chip and, based on that temperature it goes into one of four other states. If the temperature is within a normal range the process moves into a normal state 401, if it is within a higher high range, the process moves into a high state 402, if the temperature is in an even higher warning range, the process moves into the warning state 403, and if the temperature is at a very high critical range, the process moves into an error state 404.

In the normal state, the firmware continually polls its temperature and performs no actual temperature control actions. If the temperature rises above the normal state, the firmware moves into a high state. In the high state the firmware may turn on the fan. It will also continue to poll the temperature to determine whether the temperature goes out of the high range. If the temperature decreases to a normal range, the process is returned to the normal state, while if the temperature increases to the warning range, the process moves into the warning state 403.

In the warning state, the host CPU 101 is notified that the HBA is running at a very high temperature. The host may then proceed to perform its own remedial actions, such as turning on auxiliary fans or notifying a human administrator of the temperature condition. In one embodiment the notification is performed by sending a command by the firmware to the host. Thus, the host is not interrupted unnecessarily.

The firmware continues to operate in the warning state and it continues to poll the temperature to determine whether it has moved outside of the warning range. If the temperature has decreased below the warning range, the process moves to the high state. If it has increased above the warning range, the process moves into the error state 404. In the error state, the firmware alerts the host that the temperature of the HBA is critical and that the HBA will be shutdown. In one embodiment this alert is done by sending an interrupt to the host processor. Shutting down the HBA is considered to be important, therefore it is considered desirable to interrupt the processor in this event, so that host software can take appropriate measures. After alerting the host, the firmware shuts down the HBA.

After shutdown, some rudimentary functions of the HBA may remain active (such as, e.g. running the fan, running the temperature sensor, and running a bus interface), allowing the host to poll the temperature and other data and/or restart the HBA. However, in most embodiments, the processors of the HBA are shut down, as are the circuits for handling network communications. Therefore, the HBA may no longer run firmware or control its own operation. Thus, at this point it is up to the host (or OS or driver software running at the host) to monitor the HBA and take any remedial measures necessary. The host may also access the HBA to determine its temperature. If the host considers it safe it can restart the HBA, causing the firmware to begin again in the initial step 400.

In some embodiments the firmware executing at the processor does not directly escalate the states. Instead this is done by additional logic 312 and 322. This allows the states to be escalated very quickly. However, the firmware may still control when and how the states are being changed by controlling various registers in the additional logic 312 and 322. The firmware usually de-escalates the states.

Furthermore, in some embodiments, the firmware only moves from the normal into the high state once thereafter assuming operation is at the high state. In other words, once the firmware determines it is in the high state it does not move back to the normal state when the temperature decreases. In these embodiments, the additional hardware may actually move between the normal and high states (by turning the fan on and off) without explicit commands from the firmware which may remain at the high state.

Additional ways by which the firmware may perform heat management is by turning off power islands (as discussed above), or sending a message to the driver running at the host instructing it to limit the amount of incoming information for network processing.

Figure 5:
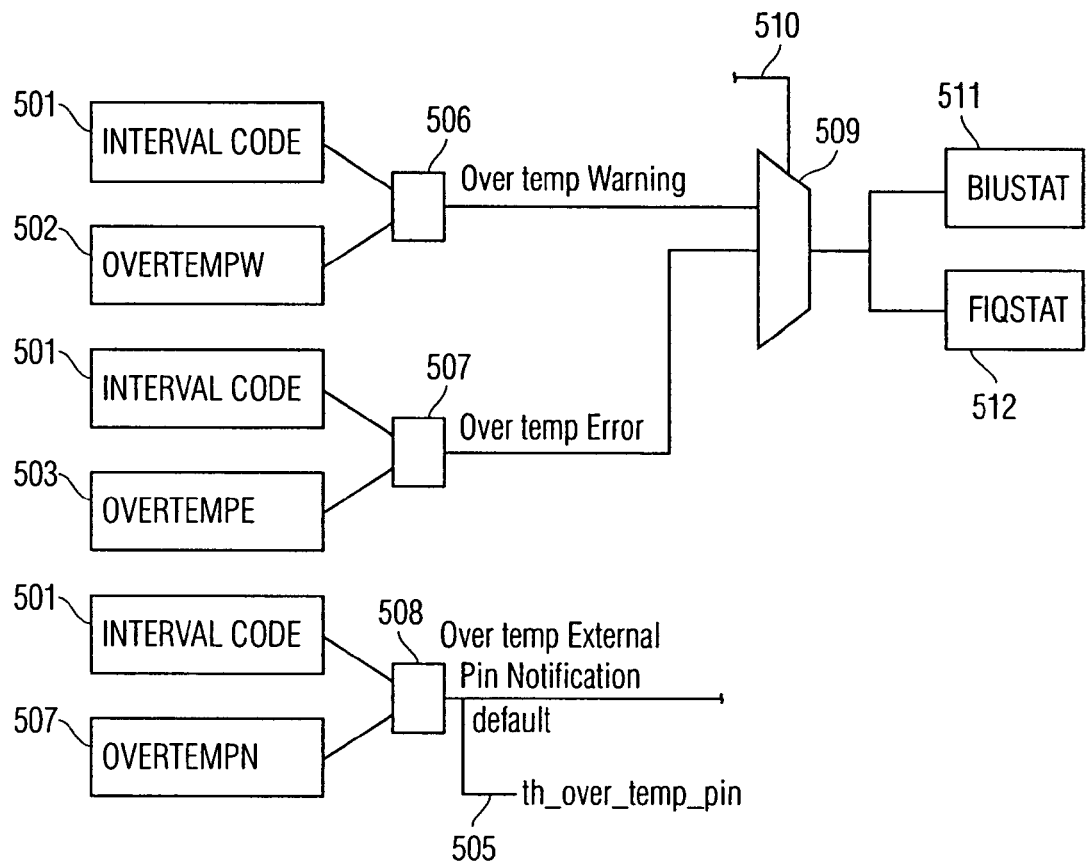
FIG. 5 is a diagram of the additional logic of a device according to embodiments of the present invention.

FIG. 5 shows how the additional logic (logic block 312 or 322 of FIG. 3) performs temperature monitoring. Interval code register 501 is a single register (shown multiple times for the convenience of drafting) which signifies the latest temperature as received from the temperature sensor. In other words, the interval code may hold the temperature value provided by the temperature sensor. The overtempw register 502 holds a 10 bit value associated with the lower bound of the warning level. The overtempe register 503 holds a value associated with the lower bound of the error level and the overtempepn register 504 holds a value associated with the lower bound of the high temperature level. The th_over_temp_pin 505 is a pin used to turn the fan on and off.

The additional logic may be configured (e.g., by the firmware) to load a new temperature value in the interval code register 501 at different intervals (e.g., 13.1 ms, 500 ms, 1 s, 2 s, etc.) The additional logic may also change the intervals based on the current state or the current temperature. Thus, at higher states or higher temperatures the current temperature may be loaded in the interval register in short intervals. This is beneficial, because when the temperature is higher and/or the state is more critical, it is more important to have the most current temperature values.

Comparators 506, 507 and 508 compare the current temperature of register 501 with the temperature values of registers 502, 503 and 504. The results of the comparators are sent to multiplexer 509. Multiplexer 509 is itself controlled by control value 510 which is provided by the firmware executing at the processor and saved in the additional logic. Value 510 represents the current state. The multiplexer, in conjunction with value 510, allows only one signal from the input signals to go through. The signal that goes through signifies whether the temperature of the current state has been exceeded. Thus, for example, if the current state is the high state, then the signal from comparator 506 would be sent through the multiplexer. If that signal is high, there will be an indication that the higher warning state has been reached because the current temperature (register 501) is higher than the lowest bound of the warning state (register 502).

If the output of multiplexer is high it will activate one of two local HBA interrupts: the BIUSTAT interrupt 511 or the FIQSTAT interrupt 512. These two interrupts cause the processors to be interrupted so that the routine of the firmware which performs the temperature control function may start executing. The firmware then notes the change of state and performs necessary actions as discussed above.

Note that the system of FIG. 5 only shows how states may be escalated, because in one embodiment, the de-escalation of states is performed by the firmware without requiring interrupts from the additional hardware. In other words, the firmware routine associated with temperature control may review the temperature and perform a de-escalation during ordinary operation of various other firmware routines. The scheme of FIG. 5 is only used to prioritize the firmware temperature control routine when an escalation is necessary by issuing an interrupt. Again, this is necessary because escalation of a state is considered much more urgent than de-escalation.

In one embodiment, as noted above, escalation and de-escalation between the normal and high temperature state is done by the additional hardware only without informing the firmware except for the first escalation from the normal to high state. Thus, after the first escalation from normal to high state, the firmware is informed that the system is in high state only, but the additional hardware may switch between normal and high states itself by turning the fan off and on. This may be the case because turning a fan off and on is a relatively simple function which may be performed by hardware without interrupting the ARM processor.

In one embodiment, there are two temperature values (a lower and a higher one) held in register 504. Thus, the fan may be turned on when the temperature reaches the higher value but turned off when it reaches the lower one. Thus, hysteresis of the fan may be provided.

Certain embodiments of the present invention may be provide a high level of programmability. In other words, certain embodiments may allow the temperature control related operations to be easily changed while the device is installed and in operation. This may be performed, for example, by sending (through a network or otherwise) configuration information to the driver 104. The driver may then reconfigure itself based and/or forward some or all of the configuration information to the device firmware 115. The device firmware may reconfigure itself based on the configuration information and may also reconfigure the device hardware by sending control signals, and/or modifying the values of various registers in the device hardware 114. The temperature thresholds at which the various states change may be reconfigured by loading different values in registers 502, 503 and 504. Also, the actions that are to be performed at each state may also be reconfigured by reconfiguring the firmware.

An advantage of embodiments of the present invention as compared to prior art systems is that in prior art systems the host has to poll the HBA periodically, while in embodiments of the present invention no polling is necessary as the HBA itself notifies the host of temperature conditions which necessitate the host's attention. In other words, prior art systems are pull type systems, while embodiments of the present invention are mostly a push type systems. However, embodiments of the present invention may also require some pulling of temperature values by the host in the relatively rare case when the device shuts down.

Currently, the firmware sets the random hardware to send an FIQ interrupt if the temperature state escalates. Alternatively, a BIU interrupt may be used. The FIQ interrupt is more reliable and faster, as it will interrupt almost any activity of the processor. On the other hand, the BIU interrupt has a lower priority than the FIQ interrupt. Thus, the BIU interrupt may be slower in interrupting the processor, as it may have to wait for other processing tasks. Since heat management is considered a high priority task, it is preferable that the FIQ interrupt be used. However, the FIQ interrupt tends to be more costly and destructive in terms of the other processes that are running on the ARM. Therefore, to improve efficiency, in some embodiments the BIU interrupt may be used for the lower temperature states while the FIQ interrupt is used for the higher temperature states.

When the firmware gets into the warning state, it sends a command to the host. The command may be queued with other similar commands and examined by the host in turn. But when the firmware gets into the error state it sends an interrupt, which may be examined by the host at a much higher priority.

In some embodiments, when temperature rises, the firmware may notify the driver to stop sending data or slow down data transfer. When the data transfer slows down the HBA will cool down. Thus, the firmware may reduce actual communication activities of the host.

In general, some embodiments of the present invention feature at least three entities—(i) software running on host (i.e. OS, driver) (ii) the firmware, which is software running on the HBA and (iii) the hardware at the HBA. Depending on the interaction between these entities, different efficiencies may be achieved. In typical computer designs, most device temperature control work is performed at the host and significant attention is required from the host to turn fans on and off, etc. In present embodiments, some actions are performed in the firmware, some in the device hardware, and some actions are performed by the host. The firmware determines when to enter various states, etc. and/or configures the hardware as to when and how these states should be entered. The firmware may also notify the host if the temperature gets too high. The firmware may react in an intelligent way to remediate high temperatures locally, or to inform the host.

Thermal behavior of HBAs is very important in many modern systems. For example, blade servers feature a high density of computers in a small space, therefore the thermal behavior of various devices in each computer is very important.

Embodiments of the present invention may also assist testing of HBAs. The flexible and customizable nature of the temperature control scheme allows HBAs to be tested in conditions which are beyond their usual normal operating conditions. For example, it is usually desired to test a prototype of HBA at temperatures beyond the point at which the HBA is supposed to automatically shut down, in order to prove that there exists a certain "safety margin" in the HBA's operation. However, such testing is naturally not possible if the HBA shuts down. In other words, once the HBA reaches its shut down temperature, it will stop normal network communications operations and would initiate a shutdown procedure. Therefore, it would be impossible to test the normal network operations of an HBA at temperatures higher than the shutdown temperature.

The flexible nature of embodiments of the present invention addresses the above issue. Because the various temperature thresholds of the HBA are all programmable, the HBA may be set with higher temperature thresholds during a testing mode in order to avoid shutdowns. E.g., the threshold for the error state may be increased. The temperature thresholds may be returned to their normal states once testing is complete.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for controlling the temperature of a device of a host computer including a host processor connected to the device, the method comprising:
   monitoring the temperature of the device by the device;
   upon determination that the temperature is within a first range, performing no temperature remediation actions;
   upon determination that the temperature is within a second range, performing one or more device specific temperature remediation actions by the device to lower the temperature of the device without involving the host processor;
   upon determination that the temperature is within a third range, performing one or more temperature remediation actions by the host processor to lower the temperature of the device;
   upon determination that the temperature is within a fourth range, notifying the host processor of an impending shutdown of the device and shutting down a device processor, but keeping operational a temperature sensor and a communication logic of the device, the communication logic configured to allow the host processor to access a device temperature value from the temperature sensor.

2. The method of claim 1, wherein the temperature remediation action is turning on a device fan.

3. The method of claim 1, wherein the temperature remediation action is powering down a portion of the device.

4. The method of claim 1, wherein the device is an HBA.

5. The method of claim 1, wherein performing one or more temperature remediation actions by the host processor to lower the temperature of the device further comprises:
   notifying the host processor that the temperature of the device is within the third range.

6. The method of claim 1, wherein notifying the host processor of impending shutdown of the device further includes notifying the host processor of a procedure to access the device's temperature.

7. The method of claim 1, further comprising:
   periodically monitoring the temperature of the device by the host processor; and
   upon determination that the device's temperature is within a desirable range, restarting the device.

8. The method of claim 1, wherein the device includes a device processor and the monitoring of the device further comprises monitoring of the temperature of the device by a device hardware distinct from the device processor.

9. The method of claim 8, wherein at least one of the one or more device specific temperature mediation actions is triggered by the device hardware distinct from the device processor, without an explicit command from the device processor.

10. The method of claim 8, further comprising:
sending configuration data from the host processor to the device;
processing the configuration data by the device processor; and
sending configuration data by the device processor to one or more registers of the device hardware distinct from the device processor in order to modify the first and second temperature ranges.

11. The method of claim 1, further comprising:
sending configuration data from the host processor to the device; and
modifying the first and second temperature ranges by the device based on the configuration data.

12. The method of claim 1, further comprising:
sending configuration data from the host processor to the device; and
modifying the one or more device specific temperature mediation actions by the device based on the configuration data.

13. The method of claim 1, further comprising periodically saving the device's temperature into non-volatile memory.

14. A host computer system comprising:
a host processor; and
a device connected to the host processor and configured to:
monitor its own temperature;
upon determination that the temperature is within a first range, perform no temperature remediation actions;
upon determination that the temperature is within a second range, performing one or more device specific temperature remediation actions by the device to lower the temperature of the device without involving the host processor;
upon determination that the temperature is within a third range, performing one or more temperature remediation actions by the host processor to lower the temperature of the device; and
upon determination that the temperature is within a fourth range, notify the host processor of an impending shutdown of the device and shutting down a device processor, but keeping operational a temperature sensor and a communication logic of the device, the communication logic configured to allow the host processor to access a device temperature value from the temperature sensor.

15. The host computer system of claim 14, wherein the device includes a device processor and the device processor is configured to perform the one or more device specific temperature mediation actions by executing device firmware.

16. The host computer system of claim 14, wherein the temperature remediation action is turning on a device fan.

17. The host computer system of claim 14, wherein the temperature remediation action is powering down a portion of the device.

18. The host computer system of claim 14, wherein the device is an HBA.

19. A storage area network comprising the host computer system of claim 14.

20. The host computer system of claim 15, wherein performing one or more temperature remediation actions by the host processor lower the temperature of the device further comprises: notifying the host processor that the temperature of the device is within a third range.

21. The host computer system of claim 14, wherein notifying the host processor of impending shutdown of the device further includes notifying the host processor of a procedure to access the device's temperature.

22. The method of claim 14, wherein the host processor is configured to:
periodically monitor the temperature of the device; and
upon determination that the device's temperature is within a desirable range, restart the device.

23. The host computer system of claim 15, wherein the device further includes device hardware distinct from the device processor and the monitoring the temperature of the device further comprises monitoring of the temperature of the device by the device hardware distinct from the device processor.

24. The host computer system of claim 23, wherein at least one of the one or more device specific temperature mediation actions is triggered by the device hardware distinct from the device processor, without an explicit command from the device processor.

25. The host computer system of claim 23, wherein the host processor is configured to:
send configuration data to the device; and
the device processor is configured to:
process the configuration data; and
send configuration data to one or more registers of the device hardware distinct from the device processor in order to modify the first and second temperature ranges.

26. The host computer system of claim 15, wherein the host processor is configured to send configuration data to the device; and
the device processor is configured to modify the first and second temperature ranges based on the configuration data.

27. The host computer system of claim 15, wherein the host processor is configured to send configuration data to the device; and the device processor is configured to modify the one or more device specific temperature mediation actions based on the configuration data.

28. The host computer system of claim 15, wherein the device processor is configured to periodically save the device's temperature into non-volatile memory.

29. A device which is part of a host computer system including a host processor connected to the device, the device being configured to:
monitor its own temperature;
upon determination that the temperature is within a first range, perform no temperature remediation actions;
upon determination that the temperature is within a second range, perform one or more device specific temperature remediation actions without involving the host processor;
upon determination that the temperature is within a third range, performing one or more temperature remediation actions by the host processor to lower the temperature of the device; and
upon determination that the temperature is within a fourth range, notify the host processor of an impending shutdown of the device and shutting down a device processor, but keeping operational a temperature sensor and a communication logic of the device, the communication logic configured to allow the host processor to access a device temperature value from the temperature sensor.

30. The device of claim 29, further including a device processor configured to perform the one or more device specific temperature mediation actions by executing device firmware.

31. The device of claim 29, wherein the temperature remediation action is turning on a device fan.

32. The device of claim 29, wherein the temperature remediation action is powering down a portion of the device.

33. The device of claim 29, wherein the device is an HBA.

34. The device of claim 29, wherein performing one or more temperature remediation actions by the host processor to lower the temperature of the device further comprises: notifying the host processor that the temperature of the device is within a third range.

35. The device of claim 29, wherein notifying the host processor of impending shutdown of the device further includes notifying the host processor of a procedure to access the device's temperature.

36. The device of claim 30, wherein the device further includes device hardware distinct from the device processor and the monitoring of the temperature of the device further comprises monitoring of the temperature of the device by the device hardware distinct from the device processor.

37. The device of claim 36, wherein at least one of the one or more device specific temperature mediation actions is triggered by the device hardware distinct from the device processor, without an explicit command from the device processor.

38. The device of claim 36, wherein the device processor is configured to:
receive configuration data from the host processor;
process the configuration data; and
send configuration data to one or more registers of the device hardware distinct from the device processor in order to modify the first and second temperature ranges.

39. The device of claim 30, wherein the device processor is configured to:
receive configuration data from the host processor; and
modify the first and second temperature ranges based on the configuration data.

40. The device of claim 30, wherein the device processor is configured to:
receive configuration data from the host processor; and
modify the one or more device specific temperature mediation actions based on the configuration data.

41. The device of claim 29 further configured to periodically save its temperature into non-volatile memory.

* * * * *